(12) United States Patent
Chang et al.

(10) Patent No.: US 8,338,655 B2
(45) Date of Patent: Dec. 25, 2012

(54) CONVERSION OF ETHANOL BROTH TO LPG AND GASOLINE

(76) Inventors: Martin Ming Yang Chang, Taipei (CN); Jyh-Cherng Shieh, Taipei (TW); Sheng-Meng Wang, New Taipei (TW)

( * ) Notice: Subject to any disclaimer, the term of this patent is extended or adjusted under 35 U.S.C. 154(b) by 393 days.

(21) Appl. No.: 12/653,958

(22) Filed: Dec. 22, 2009

(65) Prior Publication Data

US 2010/0174127 A1  Jul. 8, 2010

(30) Foreign Application Priority Data

Dec. 22, 2008  (CA) ..................................... 2648856

(51) Int. Cl.
*C07C 1/00* (2006.01)

(52) U.S. Cl. ......... 585/640; 585/408; 585/469; 585/733
(58) Field of Classification Search .................. 585/408, 585/469, 640, 733
See application file for complete search history.

(56) References Cited

U.S. PATENT DOCUMENTS 4,621,164 A * 11/1986 Chang et al. .................. 585/733

* cited by examiner

*Primary Examiner* — Randy Boyer

(57) ABSTRACT

A process for converting a dilute ethanol solution to liquid hydrocarbon fuels such as LPG and gasoline by preferentially driving-off the ethanol molecules in the solution across the liquid-air interface and streaming same into a heating and catalytic reacting system maintained at the conversion conditions. The concentration of the dilute ethanol solutions are in the range of from 5% to 15% ethanol and the reacting system comprises a zeolite type of catalyst such as ZSM-5.

5 Claims, No Drawings

CONVERSION OF ETHANOL BROTH TO LPG AND GASOLINE

This invention relates to an improvement in the production of hydrocarbons using a dilute ethanol-water solution such as the fermentation broth of a biomass mixture containing ethanol and more particularly to a method for the production of LPG and gasoline.

In order to breach the monopoly control of petroleum based fuel by the OPEC countries, ethanol based automotive fuels such as gasohol and E-85 has been established as the automotive fuel. It is well known that by far the majority of industrial production of ethanol comes from fermentation of biomass which basically comprises distillation of the fermentation broth with ethanol concentrations ranging from about 5% to 15% (herein after all concentrations expressed are in weight percent). For ethanol to be used as the automotive fuels, however, the water fraction of the broth along with other fermentation residue must be removed essentially completely to make a so-called fuel grade alcohol. The latter process is excessively energy intensive and this shall be avoided as much as possible in order to improve the economy of the production.

U.S. Pat. No. 4,621,164 issued to this inventor and his Purdue colleagues discloses the conversion of an ethanol-water solution in molar concentration, i.e., 72% ethanol and 28% water, to a spectrum of hydrocarbons composed of basically gasoline and LPG, here-in-after referred to as the Purdue patent, with ZSM-5 as the catalyst. This patent further discloses that ethanol solutions of other concentrations from 90% to 30% may all give gasoline to different yields which maximized at 72% ethanol and decreased steadily at the lower concentrations to LPG.

U.S. Pat. No. 4,698,452 issued to La Vern Mao et al. discloses a process which converts ethanol-water solution of 2 to 19% over a zeolite catalyst to yield hydrocarbons predominantly ethylene, i.e. in the neighborhood of 99% purity but nothing else. It is therefore unknown to these inventors as well as all others skillful in the art how to directly convert the dilute ethanol-water solution to liquid type hydrocarbon fuel such as gasoline.

It is therefore an object of this invention to provide an improved method for the catalytic conversion of a dilute ethanol water solution to liquid hydrocarbon fuels.

It is a further object of this invention to provide a process for the conversion of an ethanol fermentation broth to gasoline.

It is a still further object of this invention to provide an improved process for the conversion of ethanol-water system to liquid hydrocarbon fuels and the control of the selectivity of such liquid products thereof.

These and other objects of the invention will become apparent from the present specification and claims.

In accordance with these objectives, one important aspect of the invention lies in the discovery of the preferential removal or driving-away of the ethanol molecules across the liquid-air interface of the solution by a number of simple physical methods. These methods include but not limit to the evaporation of or slow heating the solution to a temperature not exceeding the boiling point of the instant solution, the passing and saturation of a dry gas through the solution and streaming the solution through a crude rectifying column, etc. For instance, to a 10% ethanol solution using the first method, the solution is heated and maintained at about 91° C. until an equilibrium state between the vapor and liquid phase is reached. The ethanol content of the vapor phase above the liquid-air interface of the system is found to be 48%. This is an increase in ethanol concentration of nearly five (5) times over that of the is liquid phase which should be termed as a preferential removal of ethanol from the ethanol-water solution.

The second important aspect of this invention lies in the findings that the catalytic conversion of the ethanol to hydrocarbons is basically a vapor phase reaction. Therefore, it is pointless to condense the ethanol vapor back into the liquid form and then use it for the reaction feed. It is certainly natural as well as advantageous to send same directly to the catalytic reactor. In this way, not only the processing stages are simplified but also the processing costs for the conversion. These findings will be shown in Example I of this Specification.

Still another important aspect of this invention is based on the finding that the product distribution of these two types of liquid fuel —gasoline and LPG—can further be altered by the manipulation in reaction conditions employed for the catalytic conversion. These reaction conditions include such parameters like temperature, flow rate or the so-called space velocity of the reactant (WHSP), etc. Thus, for a fixed temperature, the variation in the flow rate will go through a maximum yield of gasoline over LPG. And, for any fixed flow rate, changing in temperature will also experience a plateau for the gasoline yield. Henceforth, the relative yield of LPG and gasoline can be altered by manipulating the reaction conditions to meet the timely market need for these two types of product. Some typical examples will also be presented herewith in Example II and Example III of this Specification.

As a summary, there is provided a novel process for converting a dilute ethanol water solution to liquid hydrocarbons which comprises first preferentially driving off the ethanol molecules in the solution and then contacting same to a catalyst of a zeolite type maintained at a temperature between about 250° C. and about 500° C. and a pressure and space velocity at which dehydration and chain-growth of said ethanol molecules take place. Said ethanol molecules will be eventually converted into a spectrum of hydrocarbons having chain-lengths in the range of $C_3$ to $C_{10}$. Furthermore, this novel process can also allow the control of the product distribution of these two liquid fuels, gasoline and LPG accordingly.

The following examples are illustrative of this invention without limiting the scope and practices of same. These examples are self explanatory and suffice in supporting the statement and claims set forth in the present application for patent.

EXAMPLE I

In this example, an aqueous solution of 10% ethanol was employed. The solution was heated in a simple pot heater to a temperature not exceeding 91° C. The vapor phase of which was found to have an ethanol concentration of 48%. This portion was in turn pumped through a heat exchanger and then a column reactor packed with ZSM-5H catalyst under the following experimental conditions: WHSV of 0.1, temperature 400° C., and pressure 1 atmosphere. The liquid hydrocarbon products were condensed and collected using an ice-water trap. The relative product distributions of the liquid hydrocarbons, analyzed by gas chromatograph, was marked as Sample 1 and listed in Table I.

The aqueous solution of ethanol was also heated to about 85° C. but was streamed into a rectifying column of three (3) column stages, maintained at about 90-98° C., the ethanol content of the vapor going out of the column was found to be around 75%. This vapor was in turn pumped through the same pre-heater, catalytic conversion and collection system as that for the first set of experiments. The gas chromatograph of this sample was marked as Sample 2 and presented in Table I.

For comparison purpose, the gas chromatograph of a commercial grade gasoline having an octane number of 92 was also given in the same table as Sample 3.

Analysis of these chromatographs indicated that the first two samples produced from this novel process resembled very closely the commercial grade gasoline of high Octane number.

TABLE I

| No. OF PEAKS | IDENTIFIED HYDROCARBONS | RELATIVE DISTRIBUTION | | |
|---|---|---|---|---|
| | | Sample 1 | Sample 2 | Sample 3 |
| 1 | | 2.3 | 0.9 | 1.8 |
| 2 | n-pentane | 9.8 | 8.2 | 8.5 |
| 3 | | 7.6 | 5.7 | 7.0 |
| 4 | n-hexane | 8.0 | 6.7 | 6.5 |
| 5 | | 3.0 | 0.2 | — |
| 6 | | 1.4 | 3.2 | 4.2 |
| 7 | | 1.3 | 2.0 | 8.1 |
| 8 | | 2.6 | 1.4 | — |
| 9 | n-Heptane | 4.7 | 5.5 | 8.2 |
| 10 | | 1.3 | 3.8 | 4.2 |
| 11 | | 2.1 | 2.5 | 6.3 |
| 12 | n-Octane | 0.2 | 1.8 | 1.8 |
| 13 | | 0.1 | 0.6 | 0.2 |
| 14 | | 1.3 | 0.2 | — |
| 15 | | 0.6 | 2.0 | 1.5 |
| 16 | | 1.1 | 1.3 | — |
| 17 | | 0.4 | 2.1 | 1.5 |
| 18 | n-Nonane | 0.5 | 1.0 | 0.4 |
| 19 | | 0.1 | 1.4 | 0.2 |
| 20 | | 0.2 | 0.3 | 0.2 |
| 22 | | 0.4 | 0.8 | 0.7 |
| 23 | n-Decane | 0.7 | 1.4 | 0.3 |
| 24 | Benzene | 1.8 | 1.5 | 1.9 |
| 25 | | 0.1 | 0.1 | — |
| 26 | | 0.3 | 0.3 | — |
| 27 | | 0.2 | 0.2 | 0.1 |
| 28 | | 0.5 | 0.4 | 0.1 |
| 29 | Toluene | 9.5 | 8.8 | 9.1 |
| 30 | | 0.5 | 0.4 | 0.3 |
| 31 | m-Xylene | 2.7 | 1.7 | 1.8 |
| 32 | p-Xylene | 2.6 | 1.7 | 2.5 |
| 33 | 0-Xylene | 15.8 | 13.2 | 10.6 |
| 34 | | 0.2 | 0.4 | 0.3 |
| 35 | Tri-methyl Benzene | 5.5 | 6.5 | 4.2 |
| 36 | Tri-methyl Benzene | 3.0 | 3.1 | 2.6 |
| 37 | Tri-methyl Benzene | 7.3 | 8.6 | 5.4 |
| 38 | | 0.3 | 0.1 | 0.2 |
| | Total Peak Area | 100.0 | 100.0 | 100.0 |

EXAMPLE II

In the second set of experiments, the outgoing vapor from the rectifying column was streamed through the same series of experimental devices as in Example I. The temperature of the conversion was set at 400° C. and the flow rate (WHSP) was altered from 0.03 h$^{-1}$ to 2.16 h$^{-1}$, to demonstrate the influence of contact time or flow rate to the product distribution between LPG and gasoline. The results were listed in Table II.

The analysis of these results and other similar experiments demonstrated that, for any fixed temperature, an optimum space velocity existed, at which the formation of gasoline boiling range hydrocarbons was a maximum. Further more, this optimum velocity was higher for higher temperature.

TABLE II

| Temperature (° C.) | 400 | 400 | 400 | 400 | 400 | 400 |
|---|---|---|---|---|---|---|
| WHSP(h$^{-1}$) | 0.03 | 0.10 | 0.20 | 0.54 | 0.85 | 2.16 |
| LPG (%) | 62.4 | 51.7 | 45.5 | 38.0 | 37.8 | 46.4 |
| Gasoline (%) | 37.6 | 48.3 | 54.5 | 62.0 | 62.2 | 53.4 |

EXAMPLE III

In doing this set of experiments, the flow rate or WHSV was fixed at 0.10 h$^{-1}$, and the temperatures of the pre-heating and conversion system were altered between 250° C. and 450° C. The purpose of these experiments was to demonstrate the influence of the conversion temperature to the product distribution between LPG and gasoline, if other reaction parameters were unchanged. These results were listed in Table III.

As it was clearly demonstrated, this set of experiments shown that, at any chosen flow rate, an optimum temperature existed at which the formation of gasoline boiling range hydrocarbons was a maximum. The yield of gasoline could reach to as much as approximately 93%, which was almost 13 times that of LPG. And for higher flow rate, the optimum temperature was also higher but the total yield of gasoline was lower possibly due to the cracking of larger hydrocarbon molecules at the elevated temperature.

TABLE III

| WHSV (h$^{-1}$) | 0.10 | 0.10 | 0.10 | 0.10 | 0.10 | 0.10 |
|---|---|---|---|---|---|---|
| Temperature (° C.) | 250 | 275 | 300 | 350 | 400 | 450 |
| LPG (%) | 84.2 | 64.0 | 7.4 | 34.6 | 51.9 | 57.5 |
| Gasoline (%) | 15.8 | 36.0 | 92.6 | 65.4 | 48.1 | 42.5 |

In conclusion, while this invention has been described with reference to certain feed stocks and operating conditions and procedures, it will be apparent to those skilled in the art that numerous alterations and departures may be made thereof without departing from the spirit of this invention. The zeolite catalysts are well known and generally available. The pressure is generally not critical and may range from 1 to 100 atmospheres or more. The space velocity can be around 0.05 to 15 WHSP depending on the dehydration activity of the catalyst employed. The reactor can be of a fixed-bed or fluidized-bed type. All such variants lie within the spirit and scope of the invention.

What is claimed is:

1. A method for producing liquid hydrocarbon fuels, the method comprising:
    providing a dilute ethanol water solution having an ethanol concentration of about 5 to 15% by weight of the solution, the solution having a liquid-air interface;
    selectively taking out at least a portion of the ethanol in the solution across the liquid-air interface to a gaseous phase and
    streaming the portion directly through a pre-heating and zeolite converting system maintained at a temperature between about 250° to 500° C., a space velocity between 0.05 to 20 and a pressure between 1 to 25 atmospheres.

2. The process as claimed in claim 1 wherein said dilute ethanol water solution is a fermentation broth.

3. The process as claimed in claim 1 wherein said selectively taking out includes applying heat to said solution not exceeding the boiling point of said solution until a liquid-air equilibrium stage is reached therein.

4. The process as in claim 1 wherein said selectively taking out includes streaming and saturating a dry gas through said solution.

5. The process as in claim 1 wherein said selectively taking out includes streaming said mixture through an appropriate rectifying system having one or more rectifying stages.

\* \* \* \* \*

UNITED STATES PATENT AND TRADEMARK OFFICE
CERTIFICATE OF CORRECTION

PATENT NO. : 8,338,655 B2  
APPLICATION NO. : 12/653958  
DATED : December 25, 2012  
INVENTOR(S) : Martin Ming Yang Chang, Jyh-Cherng Shieh and Sheng-Meng Wang Page 1 of 1

It is certified that error appears in the above-identified patent and that said Letters Patent is hereby corrected as shown below:

On the cover page, under Inventors, after "Martin Ming Yang Chang", please delete:

"Taipei (CN)"

and replace with:

-- Taipei (TW) --.

Signed and Sealed this  
Twelfth Day of February, 2013

Teresa Stanek Rea  
*Acting Director of the United States Patent and Trademark Office*